3,816,608
PREPARATION OF BERYLLIUM HYDRIDE BY PYROLYSIS OF A DI-TERTIARY-ALKYL BERYLLIUM ETHERATE

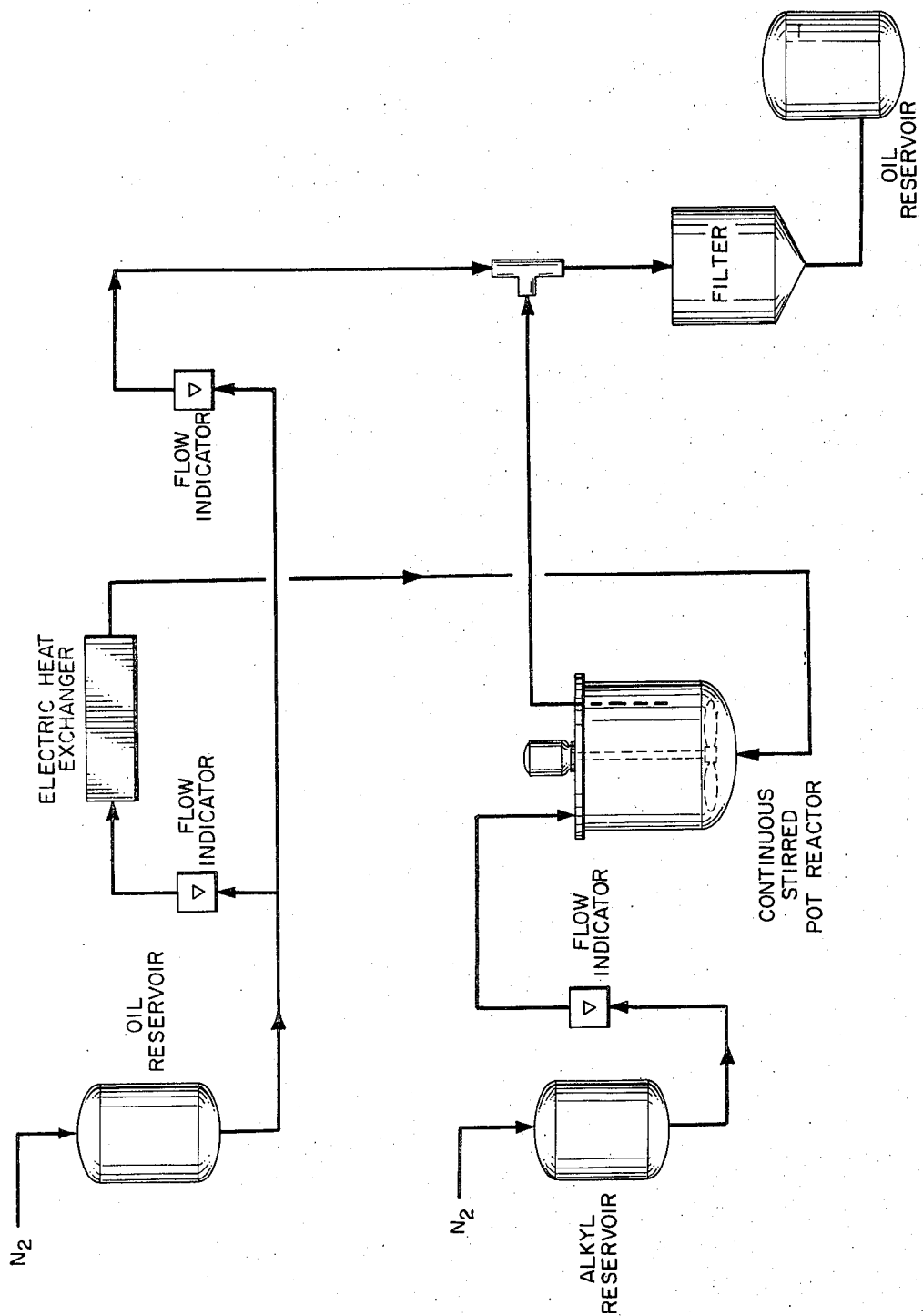

Ralph W. Baker, Greenwell Springs, and Charles R. Bergeron and Adam Nugent, Jr., Baton Rouge, La., assignors to Ethyl Corporation, Richmond, Va.
Filed Oct. 5, 1967, Ser. No. 674,058
Int. Cl. C01b 6/00
U.S. Cl. 423—645      4 Claims

ABSTRACT OF THE DISCLOSURE

Beryllium hydride is prepared by the continuous pyrolysis of a tertiary alkyl beryllium compound. A stream of cold beryllium alkyl is contacted with a stream of hot inert solvent which provides the heat of pyrolysis. The reaction temperature is regulated by adjusting the relative flow rates of the reactants.

---

This invention relates to the provision of a novel and improved method for the preparation of beryllium hydride.

Beryllium hydride has been synthesized by Head, Holley and Rabideau [J. Am. Chem. Soc. 79, 3687 (1957)] using ether-free di-tertiary-butyl beryllium and by Hellman and Mears (National Bureau of Standards, private communication). The latter investigators heated the di-tertiary-butyl beryllium etherate to about 120° C. under 60 millimeters pressure of nitrogen; these conditions were maintained for about four days until the compound became jelly-like. At this point the pressure was lowered to the limit of the pump and the temperature raised to 200° C. over a period of about 2.5 hours and held there for an additional 1.5 hours. The flask was then cooled to 110 to 120° C. and pumping was continued for seven days. The product was a white porous mass which could be easily broken into a powder.

The foregoing methods suffered from the difficulty of removing ether and cleavage products from the highly immobile gel which is the primary product of these methods. These difficulties were largely overcome by Lowrance (U.S. patent application Ser. No. 176,865, filed Feb. 26, 1962) who prepared beryllium hydride by the thermal decomposition in solution in an inert solvent of a di-tertiary-alkyl beryllium etherate wherein each of the tertiary alkyl radicals contained 4 to 20 carbon atoms. Lowrance's batch pyrolysis method proved highly successful for the preparation of beryllium hydride in laboratory or bench-scale operations but the high heat flux required (for large pyrolysis vessels) by the fact that the pyrolysis reaction is highly endothermic resulted in thermal decomposition on the reactor walls and consequent inefficiency of heat transfer and degradation of product from subsequent operations. Some of the material adhering to the reactor wall sloughs off during subsequent operations. Accordingly, it is an object of the present invention to provide a method of preparing beryllium hydride which does not suffer from the aforementioned difficulties. Another object of this invention is to provide a method for preparing beryllium hydride in high yield and in an easily recoverable form. Still another object of this invention is to provide a method for preparing beryllium hydride which is applicable to large-scale operations. Additional objects will appear hereinafter.

The process of the present invention comprises preparing beryllium hydride by the continuous thermal decomposition, in solution in an inert solvent (suitably, a high-boiling hydrocarbon oil), of a di-tertiary-alkyl beryllium etherate wherein each of the tertiary alkyl radicals contains 4 to 20 carbon atoms. An embodiment of the present invention is the formation of beryllium hydride by the continuous pyrolysis of a di-tertiary-alkyl beryllium etherate in a process which involves the contact of a stream of cold beryllium alkyl with a stream of hot inert solvent. A further embodiment of the present invention is a process for contacting a stream of cold beryllium alkyl with a stream of hot inert solvent wherein the reaction temperature is regulated by adjusting the relative flow rates of the reactants. An additional embodiment of this invention is the formation of beryllium hydride by the continuous pyrolysis of di-tertiary-butyl beryllium etherate. Still other embodiments will appear hereinafter.

The method of beryllium hydride synthesis herein disclosed offers a number of distinct advantages over hitherto available methods. Thus the demonstrated feasibility of continuous pyrolysis removes major scale-up difficulties which previously existed in batch pyrolysis of beryllium alkyls, namely, the surface decomposition problems associated with high heat flux to large volume pyrolysis vessels and the difficulty of providing adequate heat transfer surface.

The invention will be more fully understood by reference to the following illustrative examples in which all parts and percentages are by weight.

EXAMPLE 1—SINGLE REACTOR

The equipment employed is shown schematically in the Figure.

The reactor is a cylindrical pot of stainless steel of 3 gallons capacity fitted with baffles and with a high-speed agitator. It is also provided with inlet pipes at the top (from the alkyl reservoir) and at the bottom (from the oil reservoir) and with an overflow pipe leading to the filter. The agitator having been set in motion, di-tertiary-butyl beryllium etherate, prepared by the reaction of tertiary butyl Grignard reagent with beryllium chloride in diethyl ether solution, was introduced at ambient temperature into the reactor via the top inlet pipe at the rate of about 35 grams per minute. Simultaneously, a high-boiling hydrocarbon oil (Bayol-35) was heated to a temperature of about 265° C. by passage through the electric heat exchanger and introduced at the rate of about 200 grams per minute through the bottom inlet pipe. All operations were carried out under an atmosphere of dry nitrogen and the agitator speed was so adjusted to the quantity of reactants that the mechanical power input was between 0.02 and 0.05 H.P. per gallon of reaction mixture. The operating temperature within the reactor was maintained at 199° C. The product passed continuously via the overflow pipe from the reactor to a filter. The total feed period was 53 minutes and the residence time of the oil and alkyl in the reactor was estimated at about 18 minutes.

The product was washed on the filter with petroleum ether and dried under vacuum at about 100° C. The yield obtained was 59 grams. Analysis by deuterolysis and gas evolution indicated a purity of 93.9 percent.

There was evidence that the actual yield of beryllium hydride was considerably greater than that indicated above since a considerable proportion of the beryllium hydride product remained in the reactor at the end of the reaction period. It was therefore exposed to reaction conditions differing considerably from those for the separated product and its characteristics and analysis were not typical of the above product.

EXAMPLE 2—EFFECT OF FEED RATIO

The procedure in this experiment was similar to that of Example 1 except that the alkyl was fed at the rate of 10.5 grams per minute instead of 35 grams per minute as in the above example. In other words the feed ratio of alkyl to Bayol-35 was 0.051 instead of 0.18 as in Example 1.

Although the feed time was somewhat longer (70 minutes) the yield of product was only 21.9 grams and the purity only 89.2 percent. The major impurity was oxygen (8.1 percent by weight as determined by radio-active decay following neutron activation compared with 2.3 percent for the product of Example 1). All evidence to date indicates that the increased oxygen content results from increased ether cleavage.

This example demonstrates the importance of a high feed ratio for purity of the product.

EXAMPLE 3—DUAL REACTOR

The procedure and equipment were similar to those of Example 1 except that a second stirred pot reactor was inserted into the system in series with the first. Thus the overflow pipe from the first reactor emptied into the second and the overflow pipe from the second led to the filter.

In this experiment the feed time was 65 minutes, the reactor temperature 200° C., and the feed ratio 0.13. The product yield was 54.2 grams, the purity 95 percent, and the oxygen content 1.62 percent by weight.

When a tubular coil reactor immersed in a bath at 206 to 245° C. is inserted in series between the second stirred pot reactor and the filter, further slight improvements in yield and greatly improved operability are obtained because of reduced solids deposition on heat transfer surfaces during oil recycle.

When the process of Example 1 is repeated using n-tridecane as the solvent, an inlet oil temperature of 230° C. and a reactant feed time of 70 minutes, similar results are obtained. When other solvents such as dodecane, tetradecane, cetane, and diphenyl methane are employed, similar results are obtained.

A considerable variety of organoberyllium compounds can be used in the practice of the present invention. Included are all beryllium alkyls having in each alkyl radical 4 to 20 carbon atoms and a tertiary carbon atom bonded to the beryllium atom. Examples of such compounds are bis(1,1-dimethylbutyl)beryllium, bis(1,1-dimethylhexyl)beryllium, bis(1,1-dimethyldecyl)beryllium, and bis(1,1-dimethyltetradecyl)beryllium. The ether of the etherate may be diethyl ether, dipropyl ether, dibutyl ether, dihexyl ether or any similar ether containing not more than about 10 carbon atoms in each alkyl radical.

Among the criteria for the choice of solvents to be employed in the reaction of this invention are that the solvents be liquid under the reaction conditions, that they be inert to both reactants and products and that their boiling points be sufficiently high to minimum vapor losses during pyrolysis. In general, the last criterion requires solvents boiling at not less than 220° C. under atmospheric pressure. Accordingly, the solvents may include aliphatic hydrocarbons such as n-tridecane, n-tetradecane, and n-cetane, bicyclohexyl, phenyl cyclohexane, 1,2,3,4-tetraethyl benzene, 1,2,4,5-tetraethyl benzene, 2 - methylbiphenyl, 2,2'-dimethylbiphenyl, 2,3'-dimethylbiphenyl, 1-methyl naphthalene, 2-ethyl naphthalene, and 1,4-dimethyl naphthalene and the like; and tertiary amine derivatives such as triisoamyl amine, N,N-di-n-propylaniline, N,N-di-n-butylaniline, 2-heptylpyridine, 2-phenylpyridine, quinoline, isoquinoline, 2-methyl quinoline, 3-methyl quinoline, 4-methyl quinoline, 6-methyl quinoline, 7-methyl quinoline, 8-methyl quinoline, 2,4-dimethyl quinoline, 5,8-dimethyl quinoline, 6,8-dimethyl quinoline, 1,2,3,4-tetrahydroquinoline, 6 - methyl-1,2,3,4-tetrahydroquinoline, nicotine, 1-nornicotine and the like.

Of the foregoing solvents, the hydrocarbons are preferred because they yield a solid product directly whereas, when amines are used, the products are obtained in solution therein and the solids must be separated to recover the products. Of the hydrocarbons, n-cetane, the alkyl naphthalenes and high-boiling hydrocarbon mixtures such as Bayol-35 are preferred because of their ready availability.

The reactions of this invention may be carried out at any temperature sufficient to result in the formation of beryllium hydride but insufficient to lead to the excessive thermal decomposition thereof. In general these temperatures fall in the range of about 180 to about 210° C. However, the preferred range is from about 199 to about 203° C. because lower and higher temperatures lead to product of decreased purity, lower temperatures resulting in the retention of some alkyl groups on the beryllium atom and higher temperatures resulting in partial thermal decomposition of the beryllium hydride product. The reactions of the invention can be carried out under pressures ranging from 100 millimeters of mercury or less to 10 atmospheres or more but, for reasons of ease of manipulation, atmospheric pressure is preferred.

As indicated above, the reaction of the invention is highly endothermic. The heat of reaction is supplied by the high-boiling oil, which is therefore introduced into the reactor at a temperature in the range of about 230 to 280° C. This is, obviously, greatly in excess of the actual reaction temperature.

The ratio of the feed rate of the beryllium alkyl etherate reactant to that of the solvent is an important reaction condition. This ratio can range from 0.01 or less to 0.8 or more. However, a range of from about 0.08 to about 0.5 is preferred and a ratio of about 0.35 is particularly preferred because, under these conditions, cleavage of the etherate and resulting contamination of the product are reduced to a minimum.

In order to avoid plugging of the inlet port owing to partial pyrolysis of the beryllium alkyl etherate reactant, it is desirable to introduce the latter above the liquid level in the reactor. Moreover, the oil should be fed well below the liquid level in the reactor to avoid heat loss resulting from excessive vaporization and subsequent recycle of the oil.

Good agitation is of importance for the success of the present process. The rate of such agitation, as measured by the energy input, can range from 0.01 horsepower or less to 1.0 horsepower or more per gallon of reaction mixture. The preferred energy input is at the rate of from about 0.01 to about 0.30 horsepower per gallon of reaction mixture because such agitation results in beryllium hydride of optimum particle size and shape.

The reactions of the present invention may be carried out under any atmosphere inert to both reactants and products. The use of dry nitrogen is preferred because of its availability and economy. Other suitable protective atmospheres include hydrogen, gaseous saturated hydrocarbons such as methane and ethane and the noble gases helium, neon, argon, krypton and xenon.

The product of the present process is beryllium hydried of a purity ranging from about 80 to about 99 percent by weight, depending upon the particular reaction conditions in use.

The beryllium hydride obtained by the process of this invention is notable for its high stability in the presence of air and moisture. This results in an unusually long shelf life as compared with other active hydrides. The product is useful as a component of high-energy fuels, as a source (by thermal decomposition) of pure metallic beryllium for use in alloys and as a chemical raw material.

Having thus described the process of this invention it is not intended that it be limited except as set forth in the following claims.

We claim:

1. In a process for the preparation of beryllium hydride by the pyrolysis, in an inert solvent, of a di-tertiary-alkyl beryllium etherate wherein each tertiary alkyl radical contains from 4 to 20 carbon atoms, the improvement which comprises (1) contacting continuously a stream of said etherate at ambient temperature with said solvent at an elevated temperature sufficient to provide in the resultant system a pyrolysis temperature in the range of from about 180° to about 210° C., the ratio of the input rate expressed in weight units of said etherate to that of said solvent being from about 0.08 to about 0.5;

(2) concurrently agitating said system at a rate which results in the introduction of from about 0.01 to about 0.30 horsepower of mechanical energy per gallon;

(3) withdrawing continuously from said system a beryllium hydride product stream; and (4) separating from said product stream a beryllium hydridep roduct containing from 80 to about 99 percent beryllium hydride by weight.

2. The process of claim 1 wherein said stream of said etherate is introduced into the pyrolysis system and above the surface of said solvent.

3. The process of claim 1 wherein said reaction temperature is in the range of from about 199 to about 203° C.

4. The process of claim 1 wherein said etherate is di-tertiary-butyl beryllium mono(diethyletherate).

References Cited

Coates, et al., Di-Tert-Butylberyllium and Beryllium Hydride, J.C.S., (1954).

Head, et al., Di-t-Beryllium and Beryllium Hydride. J.A.C.S., 1957.

CARL D. QUARFORTH, Primary Examiner

R. L. TATE, Assistant Examiner

PO-1050
(5/69)

UNITED STATES PATENT OFFICE
CERTIFICATE OF CORRECTION

Patent No. 3,816,608        Dated June 11, 1974

Inventor(s) Ralph W. Baker, Charles R. Bergeron and Adam Nugent, Jr.

It is certified that error appears in the above-identified patent and that said Letters Patent are hereby corrected as shown below:

Column 3, line 52 reads "minimum", should read -- minimize --. Column 4, line 61 reads "active hydrides.", should read -- active metal hydrides. --. Column 5, line 11 reads "be", should read -- be- --; line 14 reads "hydridep roduct", should read -- hydride product --. Column 6, line 12 (under heading of References Cited) reads "Di-t-Beryllium", should read -- Di-t-Butylberyllium --.

Signed and sealed this 12th day of November 1974.

(SEAL)
Attest:

McCOY M. GIBSON JR.
Attesting Officer

C. MARSHALL DANN
Commissioner of Patents